United States Patent [19]

Bolza-Schünemann

[11] Patent Number: 4,680,806
[45] Date of Patent: Jul. 14, 1987

[54] EDGE LOCATION MEASURING HEAD

[75] Inventor: Claus A. Bolza-Schünemann, Würzburg, Fed. Rep. of Germany

[73] Assignee: Koenig & Bauer Aktiengesellschaft, Wurzburg, Fed. Rep. of Germany

[21] Appl. No.: 745,047

[22] Filed: Jun. 17, 1985

[30] Foreign Application Priority Data

Dec. 4, 1984 [DE] Fed. Rep. of Germany ....... 3444172
Dec. 20, 1984 [DE] Fed. Rep. of Germany ....... 3446531

[51] Int. Cl.$^4$ ............................................. G06K 9/00
[52] U.S. Cl. ..................... 382/65; 250/557; 250/561; 250/571; 356/375; 358/285; 382/48
[58] Field of Search .............. 382/48, 65; 250/561, 250/557, 571; 356/375; 358/292, 93, 101, 107, 291, 293, 285

[56] References Cited

U.S. PATENT DOCUMENTS

| | | | |
|---|---|---|---|
| 3,833,816 | 9/1974 | Emura et al. | 250/571 |
| 4,309,106 | 1/1982 | Smith | 356/375 |
| 4,317,138 | 2/1982 | Bryan et al. | 358/291 |
| 4,326,222 | 4/1982 | Connin et al. | 358/292 |
| 4,559,452 | 12/1985 | Igaki et al. | 250/561 |

FOREIGN PATENT DOCUMENTS 2046602 9/1973 Fed. Rep. of Germany .
2808528 3/1981 Fed. Rep. of Germany .
3032950 2/1984 Fed. Rep. of Germany .

Primary Examiner—Leo H. Boudreau
Attorney, Agent, or Firm—Jones, Tullar & Cooper

[57] ABSTRACT

A measuring head for detecting the location of an object such as a moving sheet of paper is disclosed. An elongated sensor having multiple light-sensitive elements is located perpendicular to the path of the object. A source of light is directed at the sensor, and those light-sensitive elements which are not in the shadow of the object produce a high output, while those in the shadow produce a low output. Circuit means are provided to provide a count of the elements and to store the count corresponding to the transition between the high and low values. This stored count, which represents the location of the object, is then displayed.

7 Claims, 5 Drawing Figures

EDGE LOCATION MEASURING HEAD

BACKGROUND OF THE INVENTION

The present invention is directed, in general, to a measuring head for the determination of the position of a body, and more particularly is directed to an edge locator for determining the location of the edge of a sheet of paper in a feeder for a sheet-fed rotary printing machine.

The use of measuring heads for detecting the location of the edge of a sheet in a sheet-feeding machine is known in the art, as exemplified by German published examined patent application No. 20 46 602. However, with the measuring head described therein, the necessary measuring accuracy and measuring speed cannot be reached at the speeds required for sheet feeders in today's technology, for present machines require speeds of 15,000 to 20,000 sheets per hour.

German patent No. 30 32 950 discloses an arrangement for tape edge control utilizing video camera images. However, such a device does not give a sufficiently accurate result, and the output is delayed too long to be useful in high-speed machinery.

SUMMARY OF THE INVENTION

It is an object of the present invention to provide a measuring head for determining the position of an edge of a sheet, particularly in a sheet feeder.

It is a further object of the invention to provide apparatus for measuring the position of the edge of a sheet in a high-speed feeder within a measuring period of approximately 10 msec., and with a measuring accuracy of at least ±0.02 mm.

Briefly, the present invention comprises a measuring head which is installed, for example, in the feed table of a sheet feeder for a machine such as a rotary printer. The measuring head includes a light sensor which consists of a row of light-sensitive devices such as conventional charge coupled devices (CCDs), the sensor being arranged in a line perpendicular to the path followed by the sheets which are to be measured, and, thus, perpendicular to the sheet edges. The measuring head may be a row of, for example, 1,728 CCDs responsive to a source of radiation, such as an infrared light source. The paper sheets to be measured pass between the light source and the CCD elements, the sheet covering a number of elements, depending upon its exact location. Light falling on the photosensitive CCD elements causes the transfer of charges within the illuminated elements, which charges are collected, and are periodically transmitted by an applied pulse to corresponding stages of a shift register. The shift register stages retain the analog voltage levels from the respective CCD elements, until they are shifted through output stages of the shift register, where they are converted to output pulses which are proportional in amplitude to the transferred charge in each of the corresponding CCDs. These pulses are then sequentially fed to an output device to produce an analog video signal representative of the intensity pattern of light falling on the CCD sensor. The transition point between a high-voltage value and a low-voltage value in the video signal is representative of the location of the edge of the paper overlying the sensing head, and this transition point is detected and converted by suitable logic circuitry to a corresponding output signal which is then supplied to a readout device to provide an indication of the sheet-edge location.

Since the CCD devices respond very rapidly to a impinging light, measurements of position can be made at a very high rate of speed. Accordingly, even with high sheet feeding rates, several edge measurements can be made on each sheet in order to insure accurate measurements. If, for example, a sheet-fed rotary printing machine is to be fed at the rate of 20,000 sheets per second, with one rotation of the cylinder per sheet, then 180 msec. are available for measuring the location of the edge of each sheet. This corresponds to a time of 0.5 msec, per degree of angle of rotation of the cylinder. If a sheet pushing device is used for feeding the sheets to such a machine, then a sheet measuring time on the order of about 10 msec. per sheet is available. However, with the device of the present invention, a complete reading of the 1728 CCD elements can be accomplished within 4 msec. utilizing a circuit clock frequency of 512 khz. This means that more than two measurements of the edge location can be obtained within a 10 msec. measurement window. The ability to make multiple edge location measurements on each sheet insures that accurate results will be obtained.

The particular advantages of the present invention lie in the fact that fast and accurate measurements can be obtained in sheet-fed rotary printing machines to determine the position of sheet edges. The present device may be operated without special optical systems, such as lenses and the like, and can, therefore, be built in a very small package. This space-saving construction permits it to be comfortably installed, for example, in the feed board of a sheet-fed rotary printing machine. The use of small, solid state electronic controls allows the operating circuitry to be built within the small package installed on the feed board, with a remotely located indicator panel.

The measuring head of the present invention can be installed in sheet feeders which do not utilize sidelays. Further, it can be used in sheet-fed rotary printing machines as the measuring element for use with final control elements, such as those which are installed for adjusting cylinders having gripper devices. Such control elements are shown, for example, in German published examined patent application No. 20 46 602. The invention may be also used for final control elements used with gripper devices mounted on the carriages of sheet-fed rotary printing machines cylinders, of the type shown in German patent No. 2808528.

The short measuring time required by the measuring head of the present invention permits the maintenance of a high level of overlap between successive sheets, for example, 70 percent, while at the same time permitting an increase in the rate at which the sheets travel, thereby increasing production speed from the presently available 15,000 sheets per hour up to 20,000 sheets per hour. Alternatively, the short measuring time allows an increase in the level of overlap to more than 70 percent without an increase in the travel rate of the stream of sheets. This allows a larger number of sheets per hour than is presently available, while still slowing down the speed of the stream of shingled sheets to provide a more gentle arrival of the sheet front edge at the frontlays of the printing machine and/or a longer rest for the sheets at the frontlays. This provides a considerable advantage over presently available devices.

A further advantage of the present device is the provision of an electronic zero reference level adjustment at the indicator. This adjustment eliminates the need for manual adjustment and fine tuning devices.

BRIEF DESCRIPTION OF THE DRAWINGS

The foregoing and additional objects, features, and advantages of the present invention will become apparent from a consideration of the following detailed description of a preferred embodiment, taken with the accompanying drawings, in which.

DESCRIPTION OF A PREFERRED EMBODIMENT

Figure 1:
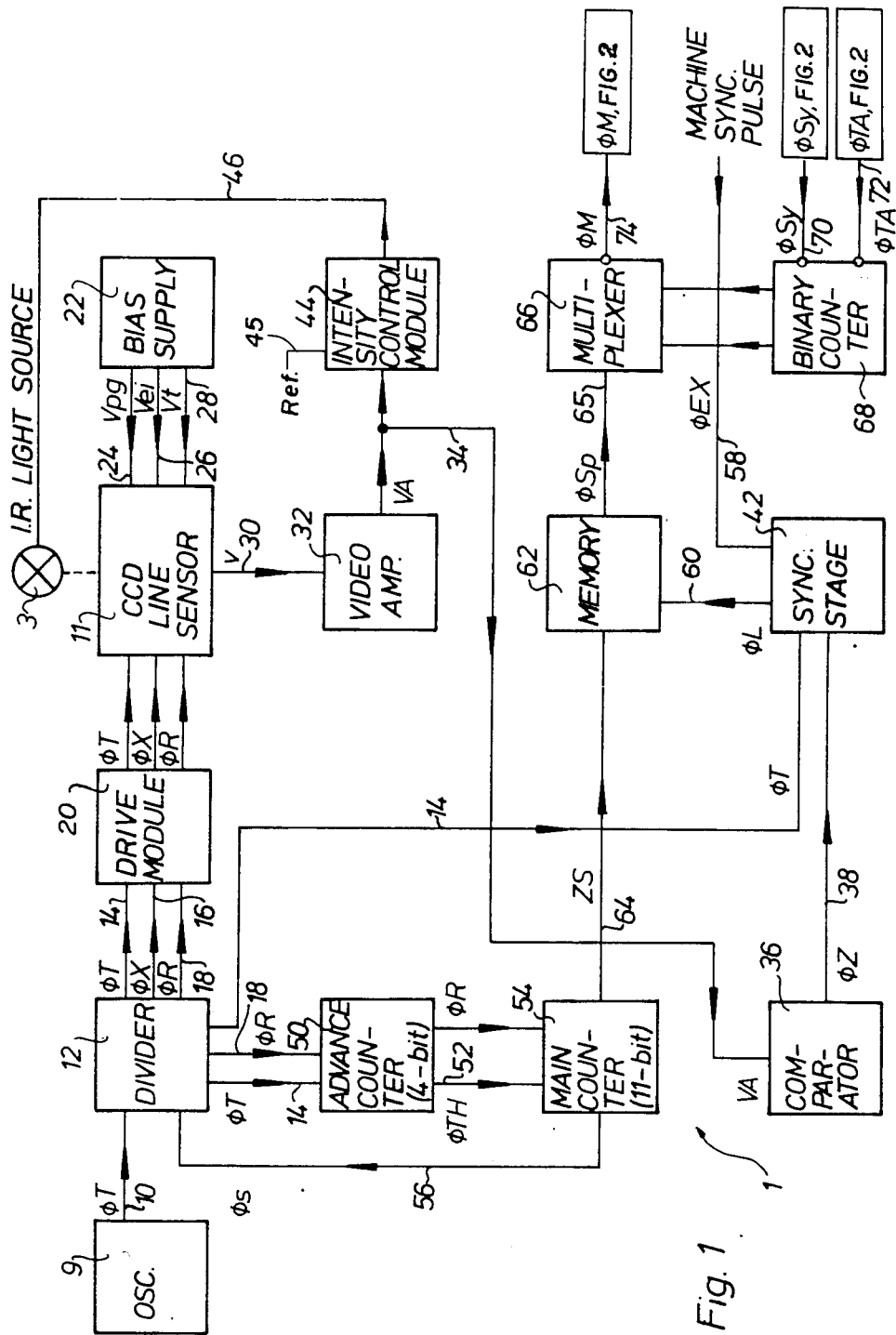
FIG. 1 is a block diagram of the measuring head and the electronic circuitry therefore, in accordance with the present invention.
Figure 4:
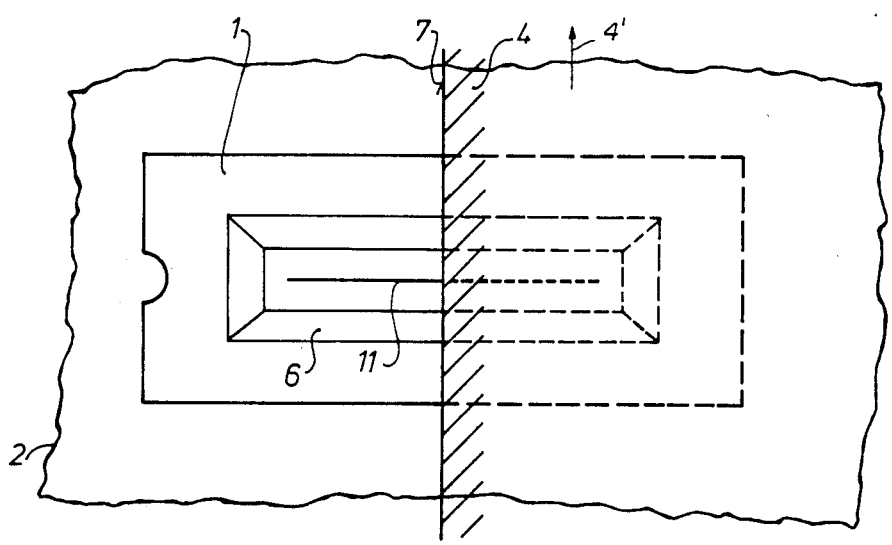
FIG. 4 is an enlarged top plan view of a measuring head.
Figure 5:
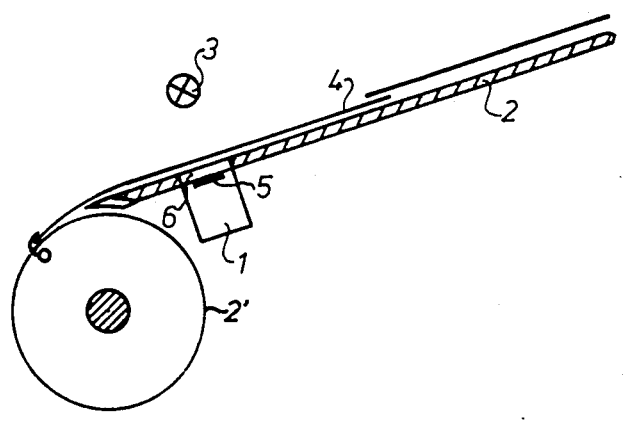
FIG. 5 is a diagrammatic illustration of a side view of a sheet-fed rotary printing machine incorporating the measuring head of the present invention.

The edge location measuring head 1 of the present invention is illustrated in diagrammatic form in FIG. 1, and is further shown in a typical installation in FIG. 5. In this latter figure, the measuring head 1 is shown mounted to the feed table 2 of a sheet-fed rotary printing machine which incorporates, for example, a sheet transfer cylinder 2'. Above the measuring head is located an infrared light source 3, which produces light having a wavelength of, for example, 750 nm to illuminate the measuring head 1. As illustrated in plan view in FIG. 4, the measuring head is mounted transversely across the feed table, and is perpendicular to the path of the body which is to be measured; for example, a sheet of paper 4 moving in the direction indicated by the arrow 4'. The measuring head 1 is arranged to extend beyond the edge of the normal path of the paper sheet 4 so that the edge 7 of the sheet that is to be measured will lie on the measuring head, with a portion of the head being covered by the sheet, and the remainder being exposed to radiation from the infrared light source.

The measuring head may be covered by a glass plate 6, which is flush with the surface of the feed table so that it does not interfere with the stream of paper sheets moving along the table. Beneath the glass plate is an infrared filter 5 which prevents interference by ambient light in the visible wavelength spectrum. Beneath the infrared filter is a measuring element which, in accordance with the preferred form of the invention, is a charge coupled device (CCD) line sensor element 11 diagrammatically illustrated in FIG. 4 and shown in block diagram form in FIG. 1. CCD line sensors are known, and may consist, for example, of 1,728 image elements arranged in a single line. Each image element is, for example, 10 micrometers wide by 13 micrometers long, with the spacing between the centers of two adjacent image elements being 10 micrometers. The CCD sensor therefore has 100 measuring cells per millimeter, and the 1728 image elements make up a line sensor 17.28 millimeters long.

The CCD line sensor 11 incorporates, in known manner, four cooperating functional groups. The first is the photosensitive group which consists of the 1728 photosensitive image elements. These elements are insulated from each other by suitable diffusion barriers and, since the image elements do not require any control electrodes that would hinder the entry of light, photons from the infrared light source 3 can directly reach the image elements. Each image element is surrounded by a potential threshold created by the diffusion barrier to prevent charges from adjacent elements from merging into each other. The line sensor also includes, at each end, an area of insulation, the length of which corresponds to eight image elements. These insulation elements normally produce a dark reference output at each end of the device. However, these reference outputs are not utilized in the present invention.

The second functional group in the CCD line sensor 11 is a group of integration elements, or memories, which individually collect the electrons generated by photons striking corresponding individual CCD image elements. Each integration element accumulates a charge which is proportional to the intensity of the light falling on its associated CCD image element. At the end of a selected integration period, these accumulated charges are transferred by a transfer pulse to corresponding stages of a shift register.

The third functional group associated with the CCD line sensor 11 is a shift register which may, for example, consist of two registers each having 879 stages. The accumulated charges in the integration elements are transferred in parallel to corresponding stages of the shift registers for subsequent serial transfer through corresponding shift register output gates to the output stages of the CCD line sensor 11.

The fourth functional group of the CCD line sensor 11 includes two serial charge-to-voltage converter output stages for the two shift registers. Each of the two shift register output gates is connected to an impedance converter where the accumulated charges from each of the CCD image elements are sequentially converted into voltage pulses, each pulse being proportional to the quantity of the accumulated charge in the corresponding image element. The voltage pulses for each CCD element are shifted sequentially through the output stages of the shift registers to produce a video signal v such as that illustrated in FIG. 3. The video signal v is a series of analog pulses having amplitudes corresponding to the accumulated charges, and this results in a corresponding analog signal representing the intensity of the light striking each of the CCD image elements in turn. The shift registers thus effectively scan the CCD line sensor 11 to produce the video output signal v. This output signal is shown in FIG. 1 as an output v from the CCD line sensor 11.

The process by which a measurement of the location of the edge of a sheet is obtained by the CCD sensor is illustrated in the block diagram of FIG. 1. The CCD sensor 11 of the measuring head 1 is driven by means of an oscillator 9, which may operate, for example, at a frequency of 1.024 MHz. The output of the oscillator is fed by way of line 10 to a divider circuit 12 which divides the oscillator output signal into transport clock signals on line 14 (see FIG. 3), transfer clock signals on line 16 (see FIG. 3), and a reset clock signal on line 18. The clock signals on lines 14, 16, and 18 are supplied through corresponding drive modules 20 which convert the clock signals to the voltage levels required for operation of the sensor 11. A bias supply 22 provides suitable bias voltage Vpg, Vei, and Vt on lines 24, 26, and 28, respectively, for use as required in the system.

The signals on lines 14, 16, and 18 are continuously generated in the divider 12, which conditions the output from oscillator 9 to produce clock signals of different frequencies and phases as required by the CCD sensor 11. Accordingly, the transfer signal on line 16 is applied through its drive module 20 to the transfer gate of the CCD sensor 11 in order to move the accumulated charges from the image sensor elements to the transport shift register. The transport signal on line 14 is applied through its corresponding drive module 20 to the corresponding gate of the CCD sensor 11 to activate the sensor's transport shift register to move the accumulated charges from the individual image sensor elements to the charge-to-voltage converter output stages of the CCD sensor, producing the video voltage v on sensor output line 30. See FIG. 3, where the video output 30 is superimposed on the CCD sensor 11. Thereafter, the reset signal on line 18 is supplied through its drive module 20 to sensor 11 to reset the CCD sensor to zero. With an oscillator frequency of 1.24 MHz, divider 12 produces transport pulses on line 14 at a frequency of 512 kHz, thus enabling the sensor to produce one complete measurement in 4 msec.

The video output signal on line 30 is amplified in amplifier 32, and is supplied by way of line 34 to a comparator 36 which produces a digital output pulse on line 38 at the light/dark transition point of the video signal. This transition point is indicated at 40 in FIG. 3 as occurring at the edge 7 of sheet 4, where the voltage v drops from a high value to a low value at the point where the sheet covers the image elements of the CCD sensor 11. The comparator 36 is equipped with at least one upper and one lower adjustable switching threshold for the video signal, and delivers a switching pulse on output line 38 which has a positive value as long as the video signal exceeds a set lower level. The output switching pulse on line 38 changes levels at the light-/dark transition point 40, which occurs when the CCD sensor 11 is in any partially covered state. The switching pulse on line 38 is supplied to a synchronization module 42, to be described.

The video signal on line 34 is also supplied to an intensity control module 44, which compares the amplitude of the video signal with a reference value on line 45. An error signal on output line 46 controls the intensity of the infrared light source 3. As has been noted above, the CCD line sensor is located a short distance below the infrared light source 3, and reacts to changes in illumination intensity. However, the CCD sensor is also sensitive to fluctuations in temperature, and accordingly the control module 44 is provided to control the intensity of the light source 3. The module compares the voltage level of the video signal on line 34 with an adjustable reference value which is selected to correspond to a desired CCD output level. The intensity of the light source 3 is then controlled by means of module 44 in accordance with the difference between the level of the video signal and the reference level to maintain the CCD output level.

The transport and the reset clock signals appearing on lines 14 and 18, respectively, are also supplied to an advance counter 50, which may, for example, be a four-bit counter. After a predetermined number of transport pulses, the advance counter switches the transport clock pulses on line 14 directly to an output line 52 where they are supplied to a main counter 54, which may be an 11-bit counter. After every 2,048 pulses, the main counter produces a set pulse on its output line 56 which is supplied to the divider circuit stage 12, where it is converted into a reset pulse on line 18. This reset pulse resets the advance counter 50 and the main counter 54 to zero, and also resets the CCD line sensor to zero. Thus, the main counter establishes the reset cycle for the line sensor.

The transport signal appearing on line 14 is also applied to the synchronization stage 42. In addition, a machine synchronizing pulse is supplied to stage 42 by way of line 58. This pulse may be generated at the indicator circuit, to be described, or if the measurement is to be executed at a particular time in the operation of the machine, then an external synchronization pulse source may be provided. Such an external source may be, for example, a bifurcated infrared light barrier, a mechanical key, or some other suitable pulse emitter responsive to the operation of the machine with which the measuring head is associated.

The synchronization stage 42 is a logic module such as an AND gate, which responds to the presence of a machine synchronizing pulse on line 58, a transport pulse on line 14, and a light/dark transition pulse on line 38 to produce a memory transfer pulse on its output line 60, the memory transfer pulse being applied to a memory stage 62.

The count of the main counter 54 is continuously fed in parallel to memory 62 by way of line 64, so that when the memory transfer pulse on line 60 is received by the memory, the count at that instant is transferred as a serial pulse train out of memory 62 by way of line 65, and is stored in a multiplexer circuit 66. This count represents the number of CCD image elements illuminated by light source 3 up to the light/dark transition point 40, and thus is an indication of the position of the edge of the sheet 4 with respect to the edge sensor.

Multiplexer 66 is controlled by a binary counter 68, preferably driven by an oscillator in the indicator circuit, to be described, by way of lines 70 and 72. The data output line 74 of the multiplexer transfers the stored count data from multiplexer 66 to the indicator of FIG. 2 at a transmission rate of, for example, 6500 bits per second.

Figure 2:
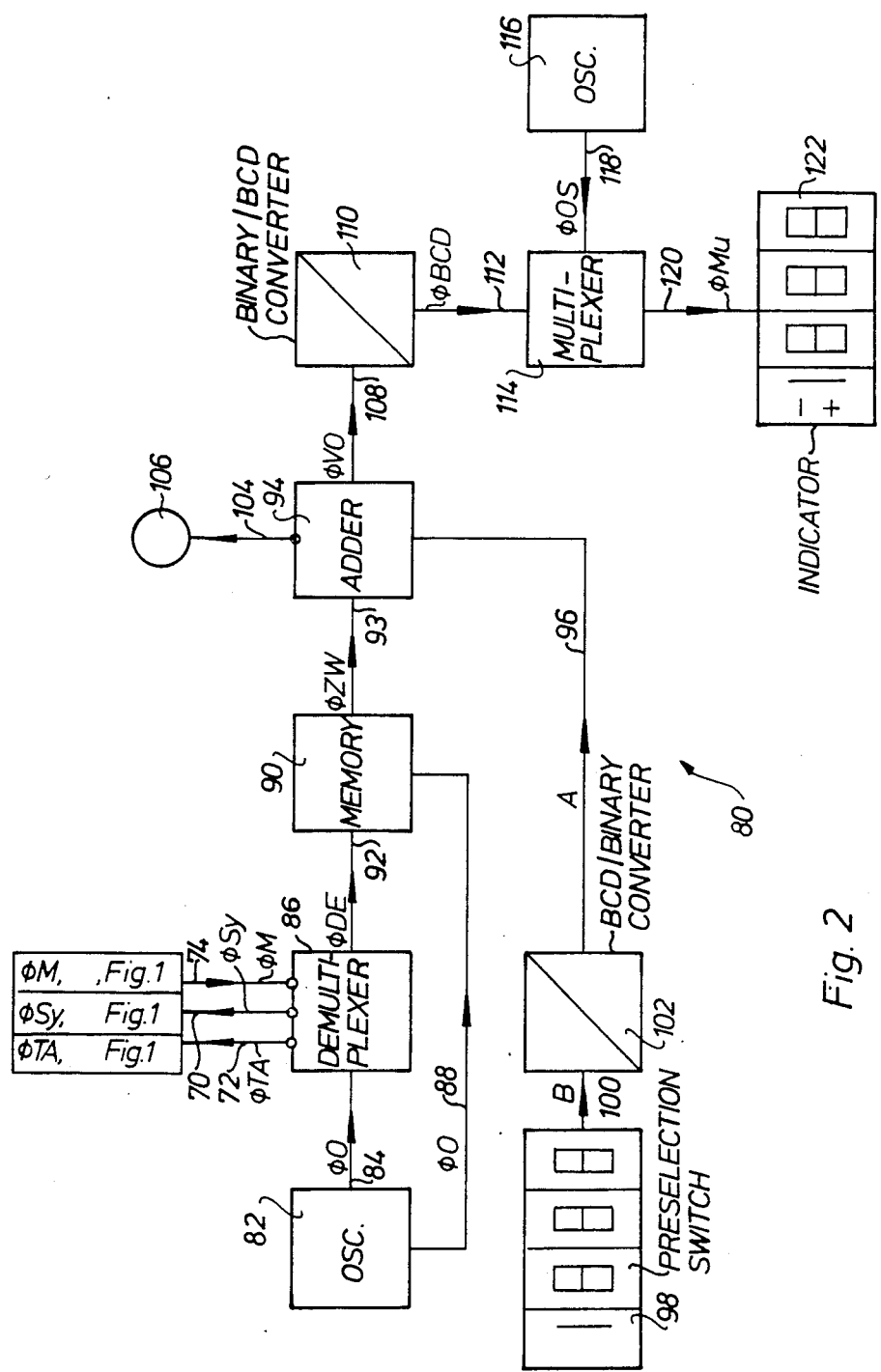
FIG. 2 is a block diagram of an indicating unit for displaying the measured values from the measuring head, in accordance with the present invention.
Figure 3:
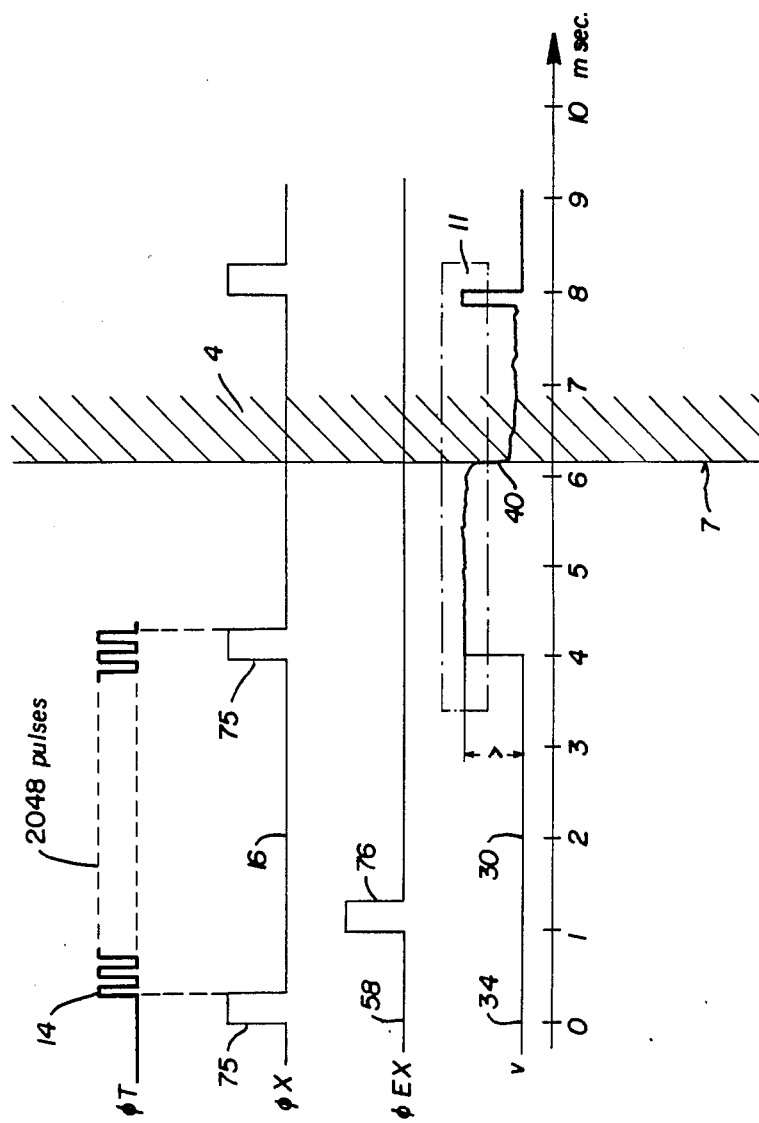
FIG. 3 is a diagram of a typical video signal generated by the CCD sensor of the invention when it is partially covered by a sheet which is to be measured.

As illustrated in FIG. 3, between each pair of transfer signals 75 appearing on line 16, the position of a body edge; for example, the position of a sheet edge 7, is measured on the CCD sensor 11. When the sensor 11 is illuminated by an infrared light source 3, it produces an analog video signal v, which signal appears on line 30. The length and amplitude of this video signal provides a measure of the intensity of the light falling on the individual CCD elements, and, thus, of the position of the body edge 7 to be measured. As also shown in FIG. 3, this measurement occurs after the occurrence of a machine synchronizing pulse 76 on line 58. As noted above, the start of a first transfer pulse 75 on line 16 following synchronizing pulse 76 initiates the production of the video output signal from the CCD line sensor 11, which signal is supplied to the comparator 36. When the light/dark transition 40 occurs, the switching signal from comparator 36 causes the synchronization stage 42 immediately to produce a memory transfer pulse on line 60. The transfer pulse activates memory 62 so that exactly at the fall-off of the video signal, the reading from the main counter 54 which is present in the memory 62 is latched and transferred to the multiplexer 66. From there, the reading is transferred to the indicating unit generally indicated at 80 in FIG. 2.

The indicator device 80 shown in FIG. 2 responds to the data produced by the measuring head circuitry 1 of FIG. 1 to produce a decimal readout of the position of the sheet edge, and to provide a sheet control signal, if desired. The indicator 80 includes an oscillator 82 which generates the clock frequency required for data transfer from the measuring head of FIG. 1 to the indicator 80. The output pulses from oscillator 82 are fed by way of line 84 to a serial-to-parallel demultiplexer 86 and are also fed by way of line 88 to an intermediate memory 90. The demultiplexer 86 generates a synchronizing pulse on its output line 70 which is supplied to binary counter 68 in order to equalize the phase relationship of the multiplexer 66 of FIG. 1 with the demultiplexer 86 of FIG. 2. The demultiplexer also produces clock signals on its output line 72, which signals are also fed to the binary counter 68 in the measuring head of FIG. 1. The data on line 74 from the sensor 1 of FIG. 1 by way of multiplexer 66 arrives serially at demultiplexer 86 and is separated into 16-bit segments for supply in parallel by way of demultiplexer output line 92 for storage in the intermediate memory 90. Any new data automatically overwrites the old data in this latter memory.

From the intermediate memory 90, the data is supplied by way of line 93, under control of the clock signals on line 88, to a full adder 94 where the data is added to a zero reference value applied to the adder by way of line 96.

A zero reference level is provided for the indicator 80 by means of a preselection switch 98 which is adjustable to produce a selected binary coded decimal signal (BCD) on its output line 100. The preselection switch 98 is adjusted to provide such a signal on line 100 representing a desired zero reference level for the measuring system, which is a value representing the desired location of the edge of a sheet on the sensor 11. This zero reference BCD value is fed to a BCD/binary code converter 102, which converts the BCD value on line 100 into a binary value which is supplied by way of line 96 to the full adder 94. However, it should be noted that the converted binary value is inverted before being supplied to the adder so that the preselection zero reference level represented by the signal on line 96 is subtracted from the signal supplied to the adder 94 from memory 90.

The adder 94 has an interface connection 104 to a computer 106 which, in turn, may control the sheet feeder in accordance with the edge position measurements obtained from the CCD line sensor. In addition, the adder produces an output on line 108 in the form of binary pulses which are supplied to a binary/BCD code converter 110 which converts the adder output to a corresponding binary coded decimal signal on line 112. This signal is supplied to a multiplexer 114 which is driven by an oscillator 116 by way of input line 118. The BCD pulses on line 112 are supplied by the multiplexer 114 by way of line 120 to an indicator 122 which produces a visual indication in decimal number form of the value measured by the CCD line sensor, less the zero position value, and, thus, of the location of the edge 7 of sheet 4 with respect to a predetermined zero position.

The preselection switch 98 provides an arbitrary zero reference level which may be set, for example, for sheet feeding devices used with a sheet-fed rotary printing machine, thus allowing an arbitrary set value for the sheet position to be entered. If this preselected value differs from the value measured by the CCD line selector, an error will be shown on the indicator 122, and a corresponding signal will be supplied to the computer 106 for use in correcting the sheet feeder operation.

The system of the present invention thus provides circuitry for supplying the CCD sensor with the necessary clock phases and voltages required for its operation, and provides means for controlling the illumination source in order to guarantee long-term stability of the system. The system provides means for amplifying the video signal produced by the line sensor and means for recognizing the dark/light transition. Counter circuit means are provided for measuring the position of the dark/light transition and for converting that position to a digital signal which is then fed to an indicator unit. The indicator unit includes a variable zero reference level which is produced by means of a preselection switch, and suitable converters are provided to allow the measured value to be displayed in decimal values with the aid of a numerical indicator. The system includes means for guaranteeing synchronization of the machine with which the device is associated by means of external electronic or mechanical synchronizing switches, and provides means for synchronizing the measuring head circuitry with the indicator circuitry. In addition, means are provided for transmitting the measured values to an external computer or other control element for response to detected errors.

Although the present invention has been described in terms of a preferred embodiment, it will be understood that variations may be made without departing from the true spirit and scope thereof as set forth in the following claims.

What is claimed is:

1. An arrangement for recording the position of an edge of a body, preferably an edge of a print carrier in a rotary printing machine, characterized by the improvement that a first oscillator is in effective contact via a dataline with a pulse divider stage;

that said pulse divider stage is in effective contact via corresponding signal lines with a drive module stage, via data lines with an advance counter, and via a signal line with a synchronization stage;

that the advance counter is in effective contact via signal lines with a main counter and via a signal line with said pulse divider stage;

that the main counter is in effective contact via a signal line with a memory stage, and said memory stage is in effective contact with a multiplexer stage via a signal line;

that said drive module stage is in effective contact via signal lines with a CCD line sensor and that this, in turn, is in effective contact with a voltage supply stage and via a signal line with a video amplifier stage;

that said video amplifier stage is in effective contact via signal lines with an intensity control module and with a comparator, the output of the comparator being in effective contact via a signal line with said synchronization stage;

that said synchronization stage is in effetive contact via a signal line with said memory stage;

that a third counter is provided which is in effective contact via signal lines with said multiplexer;

that said synchronizing stage has an input for an external switch pulse;

that said multiplexer has a pulse output; and that said third counter has inputs for the acceptance of synchronization and clock pulses.

2. A measuring head circuit in accordance with claim 1, characterized by the improvement that for the evaluation of the measured values of the measuring head, an indicating unit is provided.

3. A measuring head circuit in accordance with claim 2, characterized by the improvement that said indicating unit has a demultiplexer which is connected via a signal line to an intermediate memory stage and via a further signal line to a second oscillator;
that said second oscillator is in effective contact via a signal line with said intermediate memory stage;
that a full adder is provided;
that said full adder is in effective contact via signal lines with said intermediate memory stage, with a binary/BCD code converter and with a BCD/binary code converter;
that said binary/BCD code converter is in effective contact via a signal line with a second multiplexer;
that said second multiplexer is in effective contact via signal lines with a third oscillator and an indicating device;
that an adjustable preselection switch is provided which is in effective contact via a signal line with said BCD/binary code converter;
that said demultiplexer is equipped with two outputs and one input, to which signal lines may be connected as connections to the measuring head.

4. A measuring head in accordance with claim 3, characterized by the improvement that an infrared radiator and an infrared filter of the same wavelengths are used as a light source.

5. A measuring head in accordance with claim 4, characterized by the improvement of a closed control loop including said intensity control module to maintain an even illumination intensity of the infrared radiator by evaluating the voltage level of the video signal of the CCD element.

6. A measuring head for determining the location of an object, comprising:
an elongated, multi-element, radiation-sensitive sensor adjacent the object to be detected;
a source of radiation directed toward said sensor, the object to be detected lying between said source and said sensor to block radiation from at least some of said sensor elements;
sensor signal means responsive to said sensor elements for producing a series of sensor signals proportional to the radiation received by each sensor element from said source and for converting said sensor signals to a corresponding video signal;
clock means driving said sensor signal means to periodically and repetitively produce said video signal;
comparator means responsive to said video signal to detect a transition point in said video signal corresponding to the location of the interface between sensor elements receiving radiation from said source and sensor elements from which radiation is blocked by an object to be detected, and for producing a switching signal representing said transition point;
main counter means responsive to said clock means to provide a sequential count of said sensor elements during the production of said video signal;
first memory means responsive to said main counter and to said switching signal for storing the count in said main counter upon production of said switching signal;
means for transferring said stored count to a second memory means; and
indicator means responsive to the count in said second memory for producing a corresponding display, said display representing the location of an object to be detected with respect to said sensor.

7. The measuring head of claim 6, wherein said indicator means further includes adjustable zero reference means for selecting a predetermined location for an object to be detected, whereby said display represents the deviation of the object from said predetermined location.

* * * * *